(12) United States Patent
Daecke et al.

(10) Patent No.: US 8,031,748 B2
(45) Date of Patent: Oct. 4, 2011

(54) CIRCUIT ARRANGEMENT AND METHOD FOR DATA TRANSMISSION

(75) Inventors: Dirk Daecke, Munich (DE); Guenther Schauer, Unterschleissheim (DE); Armin Tannhaeuser, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 222 days.

(21) Appl. No.: 12/017,898

(22) Filed: Jan. 22, 2008

(65) Prior Publication Data
US 2008/0151924 A1 Jun. 26, 2008

Related U.S. Application Data

(63) Continuation of application No. 09/697,262, filed on Oct. 26, 2000, now Pat. No. 7,352,711.

(30) Foreign Application Priority Data

Oct. 29, 1999 (DE) .................................. 199 52 303

(51) Int. Cl.
*H04L 12/64* (2006.01)
(52) U.S. Cl. ......... 370/524; 370/537; 370/477; 375/222
(58) Field of Classification Search .................. 370/294, 370/389, 419, 442, 458, 468, 473, 474, 477, 370/498, 514, 524, 532, 537; 375/222
See application file for complete search history.

(56) References Cited

U.S. PATENT DOCUMENTS

| | | |
|---|---|---|
| 5,448,635 A | 9/1995 | Biehl et al. |
| 5,909,445 A | 6/1999 | Schneider |
| 6,208,637 B1 | 3/2001 | Eames |
| 6,208,670 B1 * | 3/2001 | Milliron et al. ............... 370/540 |
| 6,215,855 B1 | 4/2001 | Schneider |
| 6,282,238 B1 | 8/2001 | Landry |
| 6,324,212 B1 | 11/2001 | Jenness |
| 6,374,288 B1 | 4/2002 | Bhagavath et al. |

(Continued)

FOREIGN PATENT DOCUMENTS

DE 19706081 8/1998

(Continued)

OTHER PUBLICATIONS

Kevin Foster, DSL modem standards—removing the access bottleneck, The Institution of Electrical Engineers, 1998, pp. 3-20.*

(Continued)

*Primary Examiner* — Chi Pham
*Assistant Examiner* — Ahmed Elallam
(74) *Attorney, Agent, or Firm* — SpryIP, LLC

(57) ABSTRACT

An apparatus and appertaining method are provided in which a transmission entity eliminates a frame word of a payload data service and transmits in payload data service in a common frame with payload of other services. Additionally, a transmission unit can provide first payload data and second payload data in a payload section of a common frame, where an entity provides an overhead section in the common frame, the overhead section comprising a common eoc channel which comprises control information related to a transmission path and to one or more transmitted services or terminal equipment types. A transmission entity can transmit overhead data in an overhead section and transmit payload data of a service in a payload section, wherein the transmission entity is configured to relocate information content of operational bits of the service transmitted in the payload section to an eoc channel provided in the overhead section.

4 Claims, 5 Drawing Sheets

U.S. PATENT DOCUMENTS

| | | | |
|---|---|---|---|
| 6,400,708 B1 | 6/2002 | Bartholomew et al. | |
| 6,404,774 B1 | 6/2002 | Jenness | |
| 6,452,923 B1 | 9/2002 | Gerszberg et al. | |
| 6,480,487 B1 | 11/2002 | Wegleitner et al. | |
| 6,519,267 B1 * | 2/2003 | Sansom et al. | 370/523 |
| 6,522,666 B1 | 2/2003 | Tzannes et al. | |
| 6,590,897 B1 * | 7/2003 | Lauffenburger et al. | 370/395.6 |
| 6,590,904 B1 | 7/2003 | Williams | |
| 6,693,916 B1 | 2/2004 | Chaplik et al. | |
| 6,747,995 B1 | 6/2004 | Brown et al. | |
| 6,760,383 B1 | 7/2004 | Darveau | |
| 6,804,267 B1 | 10/2004 | Long et al. | |
| 6,853,647 B1 | 2/2005 | Rawson et al. | |
| 6,882,657 B1 | 4/2005 | Werner | |
| 6,891,851 B1 * | 5/2005 | Demakakos | 370/467 |
| 6,904,083 B2 | 6/2005 | Young et al. | |
| 6,990,093 B1 | 1/2006 | Rantalainen et al. | |
| 7,133,441 B1 * | 11/2006 | Barlev et al. | 375/222 |
| 2002/0018491 A1 * | 2/2002 | Balatoni | 370/485 |
| 2002/0054597 A1 * | 5/2002 | O'Toole et al. | 370/395.41 |
| 2002/0114045 A1 | 8/2002 | Doucet et al. | |
| 2003/0174735 A1 | 9/2003 | Daecke et al. | |
| 2004/0081123 A1 | 4/2004 | Bremer et al. | |
| 2004/0146068 A1 | 7/2004 | Chaplik et al. | |
| 2004/0179552 A1 | 9/2004 | Palm | |
| 2005/0129103 A1 | 6/2005 | Palm | |

FOREIGN PATENT DOCUMENTS

| | | |
|---|---|---|
| DE | 19802600 | 8/1999 |
| WO | 9921311 | 4/1999 |

OTHER PUBLICATIONS

ETSI Technical Report ETR 080, "Transmission and Multiplexing TM; Integrated Services Digital Network (ISDN) Basic Rate Access; Digital Transmission System on Metallic Local Lines," Nov. 1996.

* cited by examiner

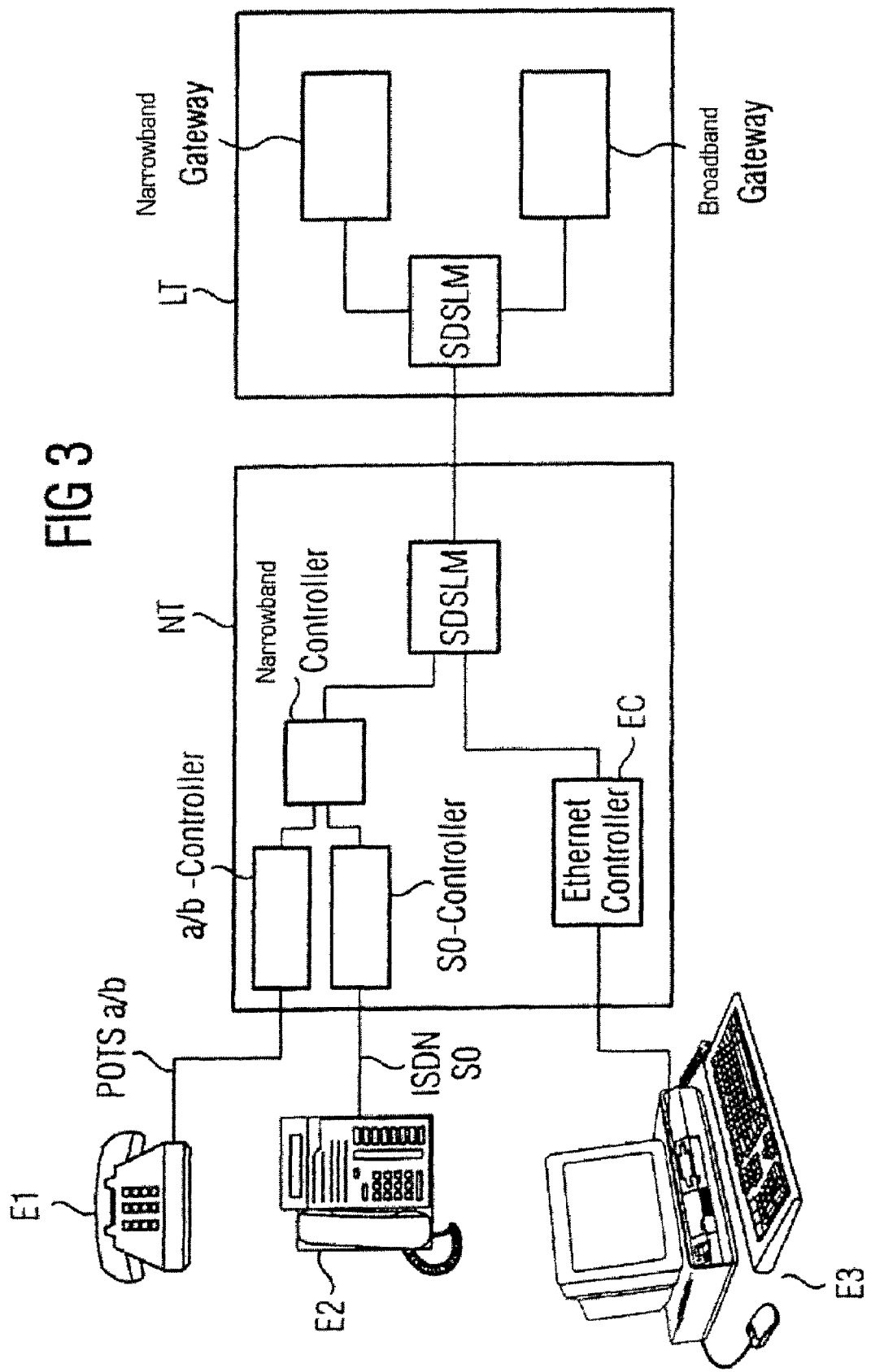

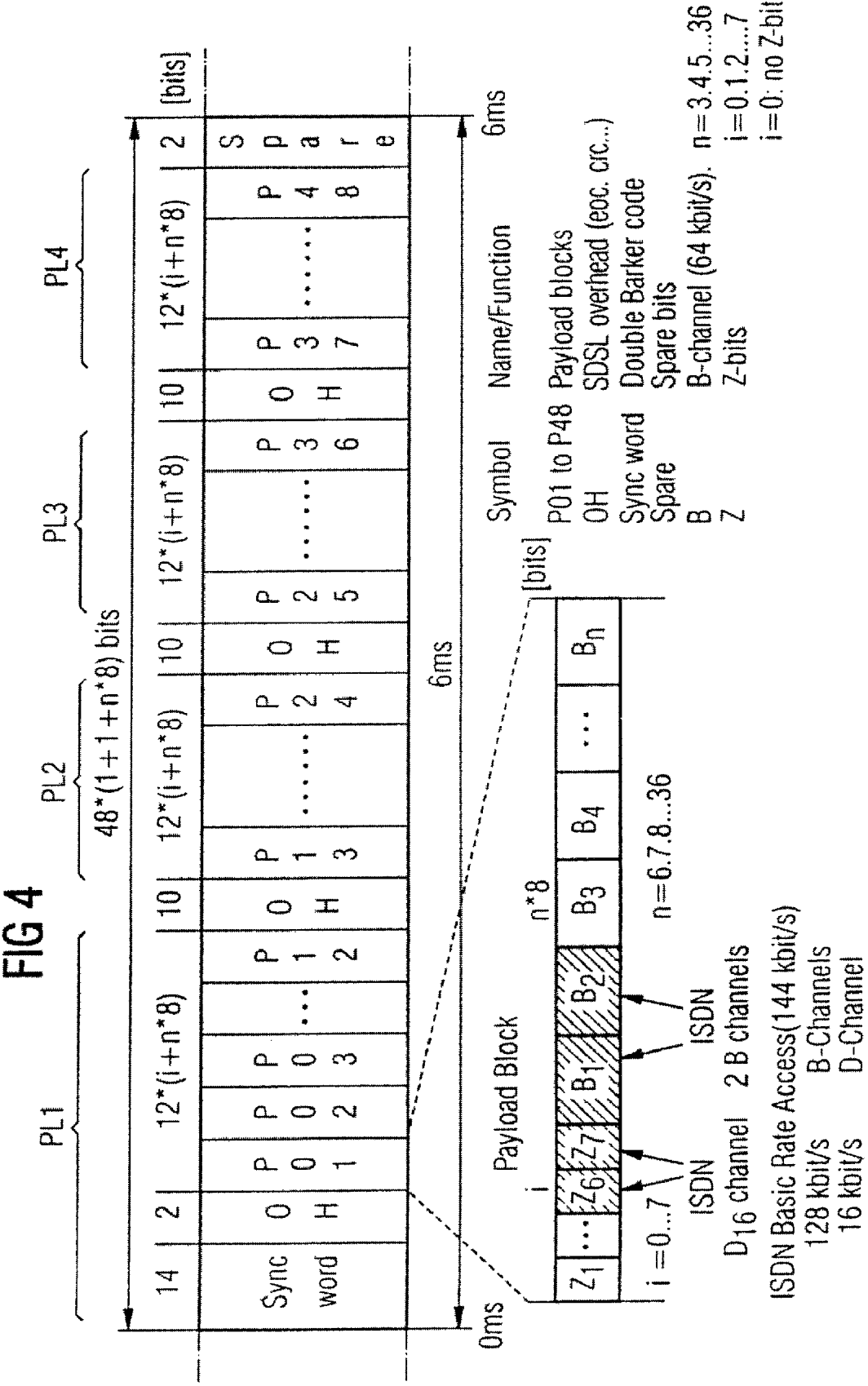

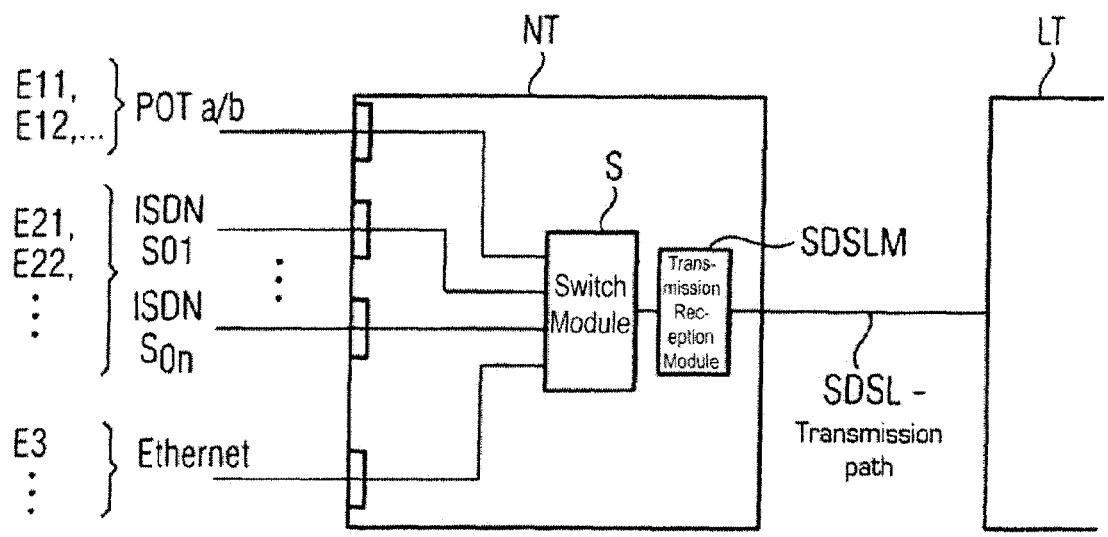

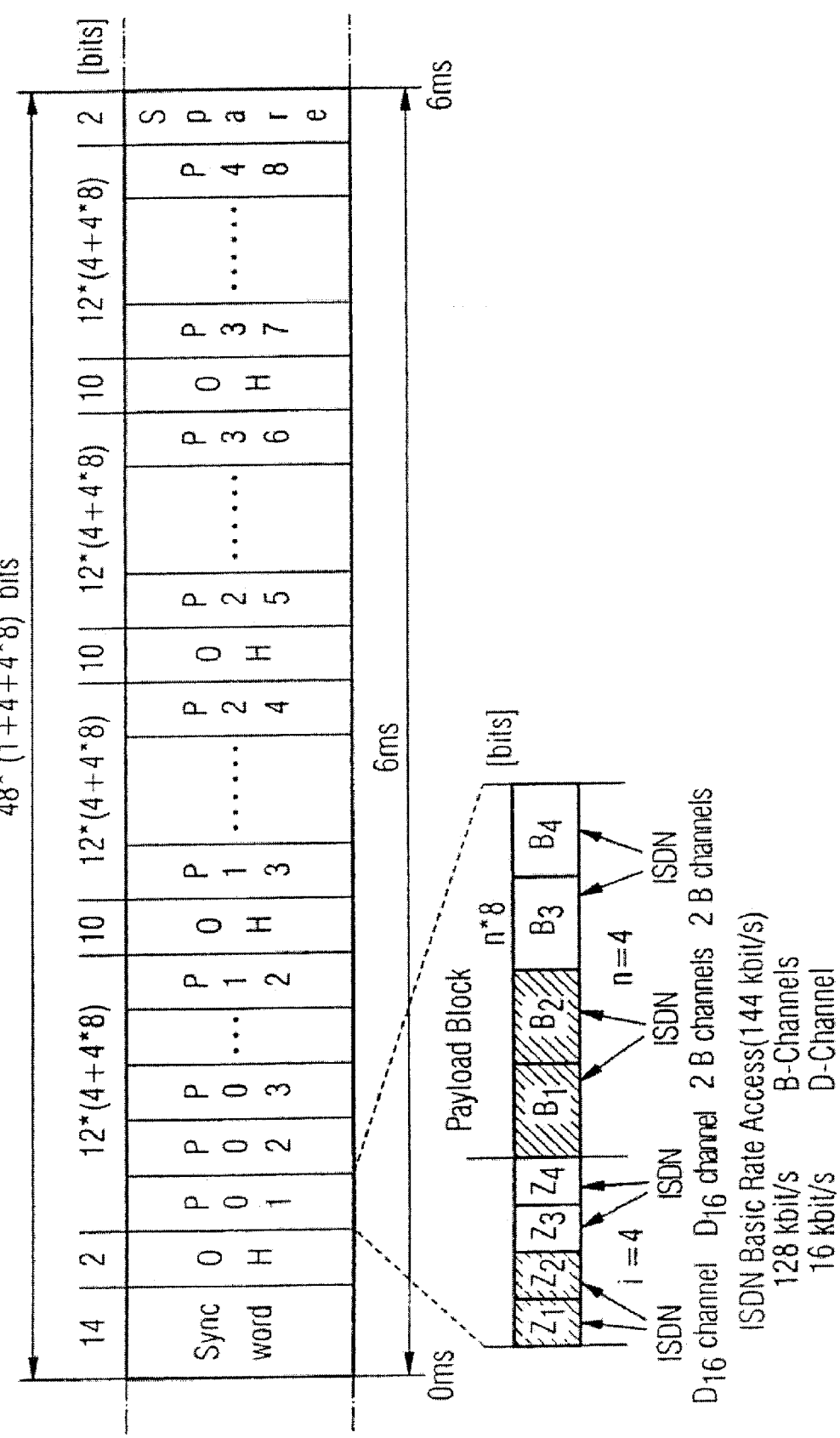

CIRCUIT ARRANGEMENT AND METHOD FOR DATA TRANSMISSION

CROSS-REFERENCE TO RELATED APPLICATIONS

This Application is a continuation of parent application Ser. No. 09/697,262, filed Oct. 26, 2000 now U.S. Pat. No. 7,352,711. The parent application is herein incorporated by reference.

BACKGROUND

The invention relates to a circuit arrangement with a transmission unit for inserting data belonging to a terminal equipment in a frame, a circuit arrangement with a reception unit for dividing a transmitted datastream to a terminal equipment type, and a method for transmitting a data stream in a frame belonging to a terminal equipment type.

In a particular network environment, a payload data rate of 144 kbit/s is offered for a subscriber within an ISDN service data network connection. This payload data rate is divided for a first and second payload data channel of 64 kbit/s each as well as for a signaling channel with 16 kbit/s. 12 kbit/s for frame words as well as an overhead channel with 4 kbit/s are required within the ISDN frame for these channels that form the payload region of an ISDN frame.

In the classic ISDN basic access, a two-wire data connecting path is employed exclusively for this ISDN service (see FIG. 1). In order to be able to utilize two-wire data connection paths between a network node and a network termination at the subscriber better, data of an ISDN connection are inserted in an approximate time-related manner, for example, in an HDSL high-speed digital subscriber line frame (see FIG. 2). A data transport with an SDSL frame is considered for the following observations. In addition to data of an ISDN connection, further data such as those of an Ethernet connection are also transmitted within a payload region.

SUMMARY

The invention is based on the object of specifying a further circuit arrangement and an appertaining method for multiple utilization of a data connection.

The stated object is inventively achieved by an apparatus comprising: a transmission unit to provide first payload data and second payload data in a payload section of a common frame; the common frame further including an overhead section, the overhead section comprising a common eoc channel, the common eoc channel comprising control information related to a transmission path and control information related to one or more transmitted services or terminal equipment types. The object is also achieved by an apparatus comprising: a transmission unit configured to eliminate a frame word of a payload data service and to transmit the payload data service in a common frame with payload of other services.

The invention is also achieved by an apparatus comprising a transmission unit to transmit overhead data in an overhead section and to transmit payload data of a service in a payload section, wherein the transmission unit is configured to relocate information content of operational bits of the service transmitted in the payload section to an eoc channel provided in the overhead section.

The stated object is also achieved by a method comprising: providing first payload data and second payload data in a common frame; providing an overhead section in the common frame, the overhead section comprising a common eoc channel, the common eoc channel comprising control information related to a transmission path and control information related to one or more transmitted services or terminal equipment types.

The invention has a number of advantages:

1) a plurality of ISDN connections can be arranged within a payload region of an SDSL symmetric digital subscriber line frame. The payload region can also be referred to as a payload data region of an SDSL frame;

2) the bandwidth of the payload region can be expanded by a relocation of operational bits;

3) a traditional telephony connection, instead of the ISDN connection, can be synchronously transmitted in the SDSL frame, for example, together with an Ethernet connection;

4) a plurality of traditional telephony connections, instead of the plurality of ISDN connections, can be transmitted in the SDSL frame;

5) the bandwidth of the payload region can be expanded by relocating operational bits, in the case of traditional telephony connections as well.

6) the available bandwidth of the eoc channel can be utilized better due to the accommodation of the information content of the operational bits in the eoc channel present in the SDSL frame in the form of suitable messages.

7) the plurality of possible, different services, for example, given a plurality of transmitted ISDN connections, are addressable on the basis of a suitable expansion of the eoc message format, for example, by inserting an eoc sub-address.

Additional advantageous developments of the circuit arrangement and of the method are discussed below.

BRIEF DESCRIPTION OF THE DRAWINGS

The following more detailed explanation of an exemplary embodiment provides other characteristics of the invention on the basis of drawings.

FIG. 3 is a schematic block diagram showing an embodiment of a network termination;

FIG. 4 is a data structure diagram showing a division of an SDSL frame;

FIG. 5 is a schematic block diagram showing a further embodiment of a network termination;

FIG. 6 is a data structure diagram showing a further division of an SDSL frame; and FIG. 7 is a data structure diagram showing an addressing field.

DESCRIPTION OF THE PREFERRED EMBODIMENTS

Figure 1:
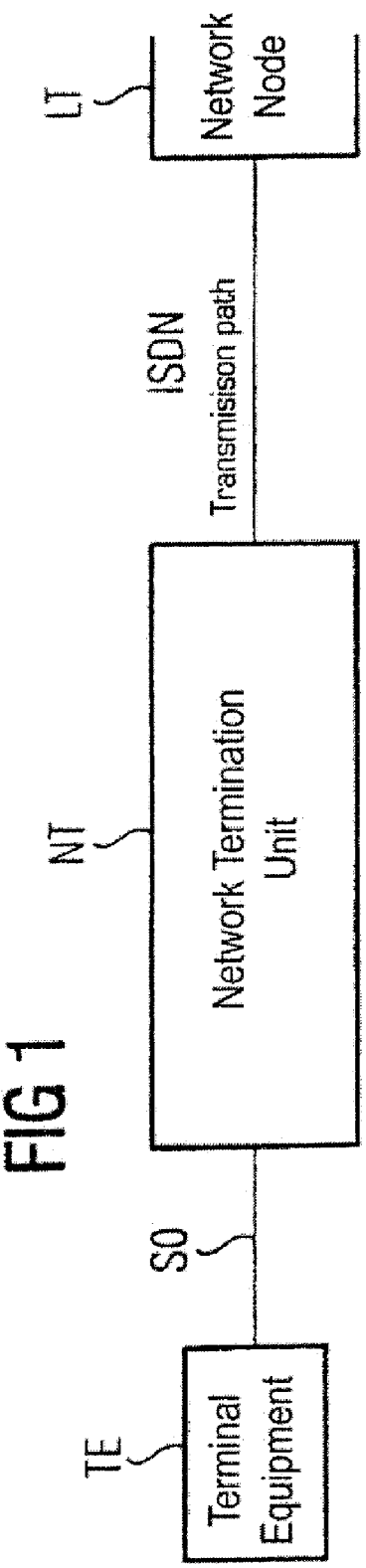
FIG. 1 is a block diagram showing an embodiment of an ISDN connection.

FIG. 1 shows an ISDN connecting path between a terminal equipment TE and a network node LT. Two-wire trunks are employed between a network node LT particularly fashioned as switching node and a network termination unit NT arranged, for example, at the subscriber.

Figure 2:
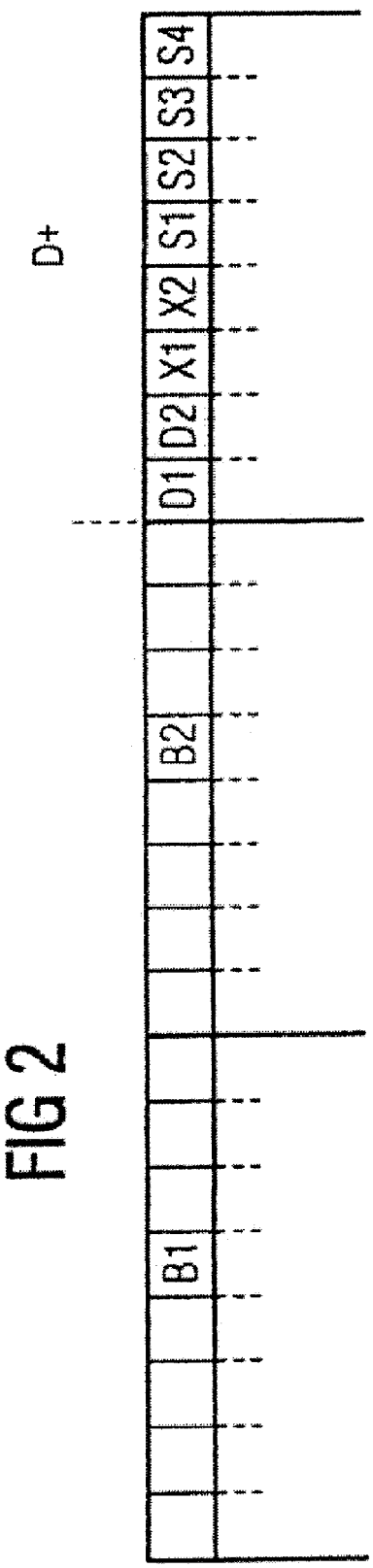
FIG. 2 is a data structure diagram showing a division of an ISDN basic data frame given plesiochronic transmission in an HDSL frame.

FIG. 2 shows a division of an ISDN channel given plesiochronic transmission in an HDSL frame. This ISDN channel comprises a first and second user channel B1, B2 as well as a signaling channel D+. The channels B1, B2 and D+ have a respective width of one byte. The division of the channel D+ is as follows:

bits D1 and D2 are for ISDN signaling, X1, X2, S1, S2, S3 and S4 are reserved for operational purposes (for example, activation, etc.).

FIG. 3 shows an SDSL symmetric digital subscriber line connection between a second unit NT, a network node, and terminal equipment E1, E2 and E3. In the network node LT, the data for the terminal equipment are taken from or, respectively, supplied to a narrow band and broadband network via corresponding gateways and are combined in the SDSL frame. The narrow band and broadband data of the SDSL frame are transmitted synchronously in time-division multiplex between a first unit LT, a network node and the network termination NT.

The merging at the transmission side and the division at the reception side of the data belonging to the narrow or/and broadband network is implemented in the module SDSLM, which can also be referred to as a transmission-reception device, according to known methods of digital time-division multiplex technology. The broadband data are forwarded to an Ethernet controller EC in the network termination NT. The narrow band data are forwarded to a narrow band controller that forwards the relevant data to the following a/b controller for the traditional telephone connection or to the S0 controller for the ISDN connection.

An Ethernet terminal equipment as well as one or more ISDN systems or one or more traditional telephone sets can be connected to the network termination unit NT. For example, the terminal equipment type E1 is a traditional telephone, the terminal equipment type E2, alternatively, is an ISDN system, and the terminal equipment type E3 is, for example, a data processing system.

The data transmission of the data in an SDSL frame occurs synchronously in time-division multiplex. The synchronization takes place with the assistance of the SDSL clock. The frame word of the ISDN frame can be eliminated in a transmission of the SDSL frame. The information contained in the overhead channel in the ISDN connection such as status information or a transmission control are already contained in the SDSL frame. Among other things, an eoc channel, also be referred to as an "operating channel", and that is synchronized with the ISDN data stream, is provided in the ISDN overhead channel. This eoc channel serves as the control channel between network equipment for operational purposes.

FIG. 4 shows the division of an SDSL frame. The SDSL frame is preferably divided into four payload blocks PL1, PL2, PL3 and PL4. Each payload block PL1, PL2, PL3 and PL4 can be sub-divided into twelve sub-blocks P01 through P12. Each sub-block is divided into an information part and into a payload data region. The data of the B1 and B2 channel of an ISDN connection are combined in two 64 kbit/s B-channels of an SDSL connection; the signaling data of the D-channel are preferably combined in two 8 kbit/s Z-channels. The further region of the sub-blocks of the SDSL frame is employed for further payload data, for example, of an Ethernet connection.

The SDSL overhead data are accommodated in the overhead section OH of the SDSL frame, these containing status information and an embedded control channel or operating channel (eoc channel) for the operation of the SDSL transmission link.

Furthermore, the start of the SDSL frame contains the 14-bit wide frame word (sync word) for the synchronization and two unused bits (spare) at the frame end.

In FIG. 5, the embodiment of an SDSL data transmission shown in FIG. 3 is expanded by a switch module S. This switch module S selects the data of various channels combined in the SDSL frame and conducts these to the corresponding terminal. This switch module contains the necessary controllers that make the transmitted connection types available to the subscriber in a suitable way.

FIG. 6 shows a further division of a payload region within an SDSL frame. The signaling information of the D-channel of a first ISDN connection S01 and those of a second ISDN connection SO2 are transmitted in this in the regions referenced Z1, Z2 and Z3, Z4. The payload data of the first and second ISDN connection SO1, SO2 are transmitted in the regions B1 through B4. The regions Z1, Z2 and B1, B2 are allocated to the first ISDN connection, and the regions Z3, Z4 and B3, B4 are allocated to the second ISDN connection. The operational control information of the respective ISDN connection are transmitted in the overhead OH of the SDSL frame, where this control information is divided into a part relating to the SDSL transmission path and into a further part that is dependent on one or more transmitted services.

FIG. 7 shows an embodiment of the eoc address expansion necessary for the addressing of the individual ISDN connections or, respectively, traditional telephone connections. To this end, the address of the eoc channel has an auxiliary address field attached to it. This auxiliary address field comprises the components service-ID and service-No that are needed for an unambiguous addressing of the respective connection.

For embedding this expansion into the previously existing message strategy for the eoc channel within an SDSL frame, a message encoding, for example, that was previously unused is used in order to transmit existing signaling for operational purposes for exactly one type of service (for example, ISDN). A specific service number within a service type (for example, one of a plurality of ISDN connections) is addressed in a following field that lies in the parameter region of this message encoding. In the same way, a further message encoding that is still free can be employed for traditional telephone connections.

The above-described method and arrangement are illustrative of the principles of the present invention. Numerous modifications and adaptations thereof will be readily apparent to those skilled in this art without departing from the spirit and scope of the present invention.

What is claimed is:

1. A method comprising:
    inserting, by a transceiver device, first payload data and second payload data in a common frame;
    allocating an overhead section in the common frame, the overhead section comprising a common eoc channel, the common eoc channel comprising control information related to a transmission path and control information related to one or more transmitted services or terminal equipment types; and
    encoding a service ID of the transmitted service in an address field of the common eoc channel.

2. An apparatus comprising;
    a transmission unit to insert first payload data and second payload data in a payload section of a common frame, the transmission unit to further allocate an overhead section in the common frame, the overhead section comprising a common eoc channel,
    the common eoc channel comprising control information related to a transmission path and control information related to one or more transmitted services or terminal equipment types and a service ID of the transmitted service in an address field of the common eoc channel.

3. The apparatus according to claim 2, wherein the common eoc channel comprises an address field comprising a service ID of the transmitted service.

4. The apparatus according to claim 2, wherein the apparatus is configured to eliminate the frame word of the first and second payload data in the payload section.

* * * * *